United States Patent
Kupniewski et al.

[19]

[11] Patent Number: 6,027,218

[45] Date of Patent: Feb. 22, 2000

[54] VIEWING SYSTEM FOR LAP TOP COMPUTERS

[75] Inventors: Amy Kupniewski, 1900 Turk St #201, San Francisco, Calif. 94115; Kenneth Tarlow, Corte Madera, Calif.

[73] Assignee: Amy Kupniewski, San Francisco, Calif.

[21] Appl. No.: 09/306,056

[22] Filed: May 6, 1999

[51] Int. Cl.[7] .................................................. G02B 7/182
[52] U.S. Cl. .......................... 359/871; 359/872; 359/856; 359/857; 359/862; 359/865
[58] Field of Search .................................... 359/871, 872, 359/856, 857, 862, 865

[56] References Cited

U.S. PATENT DOCUMENTS

| | | | |
|---|---|---|---|
| 5,130,856 | 7/1992 | Tichenor et al. | 359/857 |
| 5,200,859 | 4/1993 | Payner et al. | 359/857 |
| 5,808,819 | 9/1998 | Deitz-Bertke et al. | 359/857 |

Primary Examiner—Cassandra Spyrou
Assistant Examiner—Mohammad Y. Sikder

[57] ABSTRACT

An improved viewing system for lap top computers with a first reflective surface member, a hinged holding bracket for the first reflective surface member, a second reflective surface member, a pair of second brackets to hold the second reflective surface member. The hinged holding bracket is capable of fitting behind and wrapping around the screen housing of the lap top computer and is comprised of a flat plate terminating at each end in a hinged triangular shaped plate, each said triangular plate having a pair of raised ribs capable of receiving the corner of said first reflective surface member. The second brackets are capable of being affixed to the top edge of said lap top computer and have upwardly angled ribs capable of receiving the bottom edge of said second reflecting surface member. The first and second reflective surface members are positioned in such a way that the user of said lap top computer can see the image generated on said lap top computer screen in the second reflective surface member which is at a higher viewing angle than said lap top screen thereby reducing the chance of neck fatigue and potential discomfort of the user.

3 Claims, 5 Drawing Sheets

VIEWING SYSTEM FOR LAP TOP COMPUTERS

BACKGROUND OF THE INVENTION

This invention relates generally to the field of lap top computers, and more particularly to an improved viewing system for lap top computers.

Computers for use in business and home have been in existence for many years. They are typically comprised of a keyboard, a box housing the computing hardware and software and a monitor for viewing the information generated by the computer. More recently compact lap top computers have been introduced that are typically book like in construction where the one half of the structure folds up to reveal a flat viewing screen. A keyboard and other control buttons are located on top surface of the other half of the computer that remains on the desk or other flat surface.

Lap top computers are currently approximately eight inches by ten inches in plan view and about one to two inches thick.

While lap top computers provide unprecedented compactness and portability, there is one flaw that is inherent to most lap top computers on the market today. That is the viewing angle which the user is forced to assume when using a lap top computer. Because the screen portion of the computer is hinged to the keyboard portion, the user must look in a downward direction while entering information into the computer rather than straight ahead. This downward angle causes strain on the users neck muscles and can cause neck pain over prolonged periods of use. The user could try to solve the neck strain problem by raising the entire lap top computer so that the viewing screen is at eye level, however, this configuration creates a new problem in that the improper angle of the users forearm and wrist can cause wrist and forearm fatigue and potential pain. As a professional physical therapist I have seen many patients that have complained of neck pain after using a lap top computer on a regular basis.

SUMMARY OF THE INVENTION

The primary object of the invention is to provide an improved viewing system for lap top computers.

Another object of the invention is to facilitate proper neck angle for a lap top computer user.

Another object of the invention is to have the device fit almost onto any lap top computer.

A further object of the invention is that the device is light weight and folds flat for compact storage and transport.

Other objects and advantages of the present invention will become apparent from the following descriptions, taken in connection with the accompanying drawings, wherein, by way of illustration and example, an embodiment of the present invention is disclosed.

An improved viewing system for lap top computers comprising: a first reflective surface member, a hinged holding bracket for first reflective surface member, a second reflective surface member, a pair of second brackets to hold said second reflective surface member. Said hinged holding bracket is capable of fitting behind and wrapping around the screen of said lap top computer and is comprised of a flat plate terminating at each end in a hinged triangular shaped plate, each said triangular plate having a pair of raised ribs capable of receiving the corner of said first reflective surface member. Said second brackets are capable of being affixed to the top edge of said lap top computer and have upwardly angled ribs capable of receiving the bottom edge of said second reflecting surface member. Said first and second reflective surface members are positioned in such a way that the user of said lap top computer can see the image generated on said lap top computer screen in said second reflective surface member which is at a higher viewing angle than said lap top screen thereby reducing the chance of neck fatigue and discomfort by the user.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
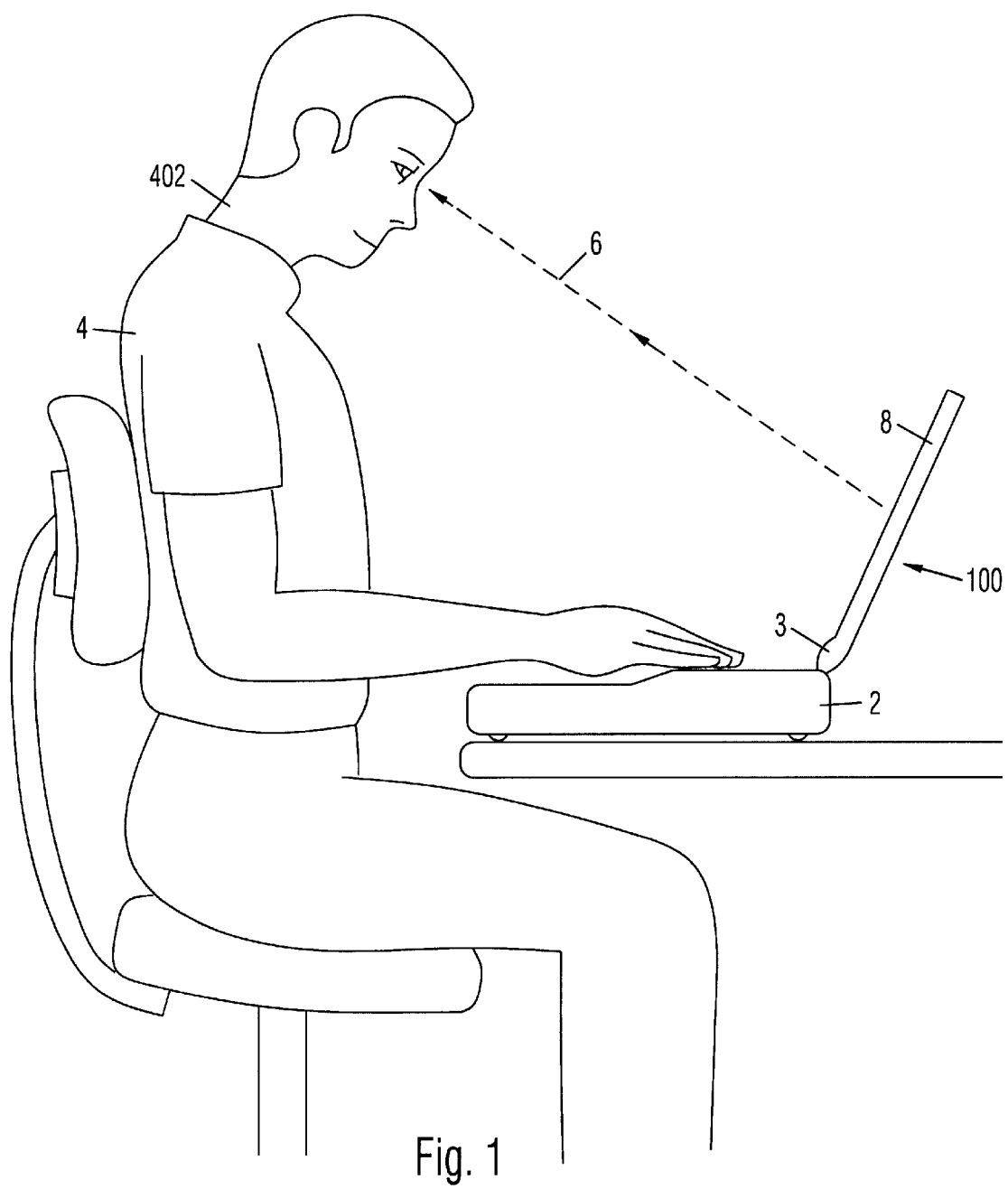
FIG. 1 is a side view of a person using a typical lap top computer.
Figure 2:
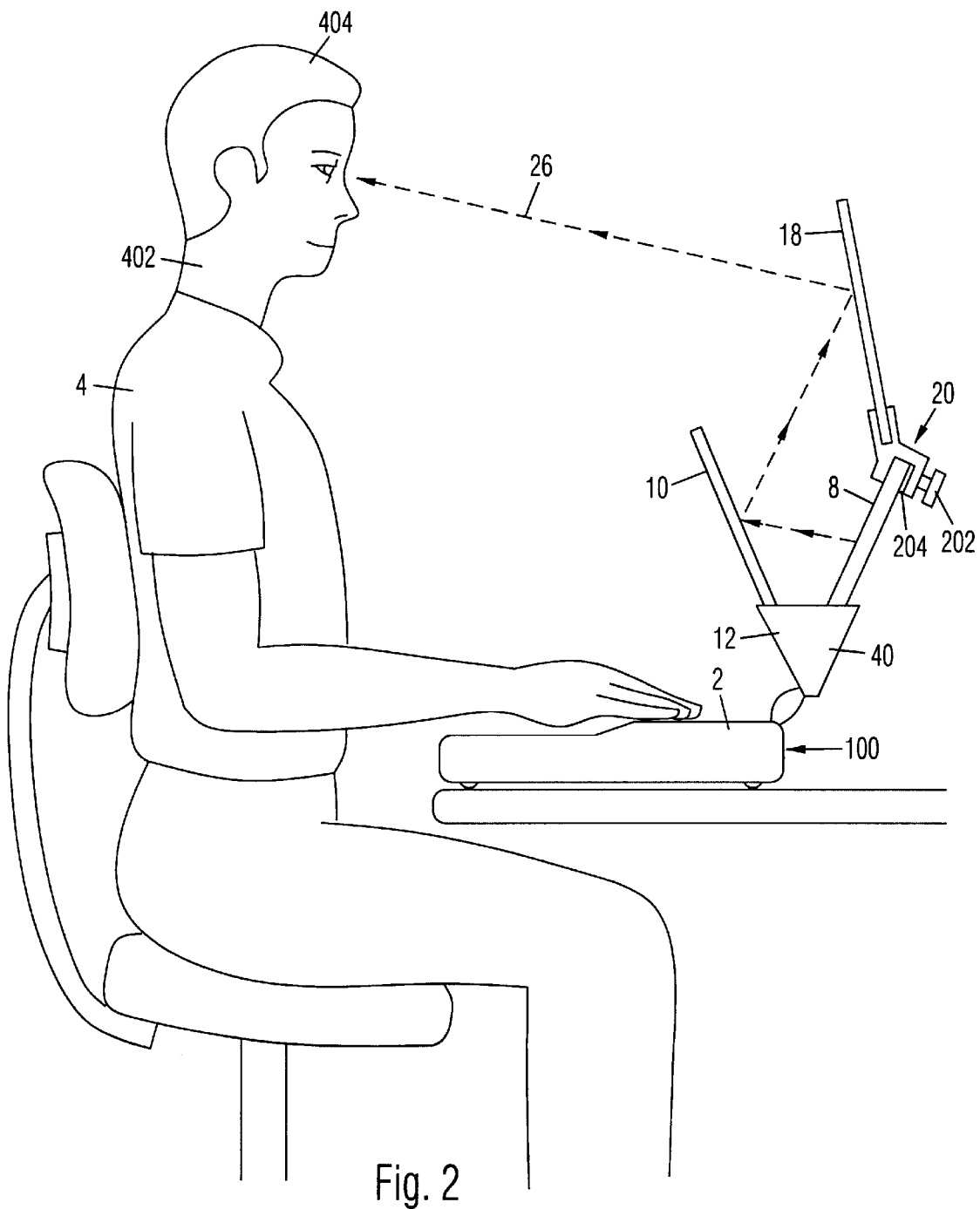
FIG. 2 is a side view of a person using a lap top computer that has the present invention affixed to it.

Referring now to FIG. 1 we see a side view of a person 4 using a typical lap top computer 100. Because the screen portion 8 is connected to the keyboard portion 2 at hinged intersection 3 the user 4 is forced to look in a downward direction to view 6 the screen 8 thereby causing neck fatigue due to the poor angle that the users neck 402 is forced to assume. FIG. 2 shows a person 4 using a lap top computer 100 with the present invention 200 attached to it. First reflective surface member 10 transmits the image generated by the computer screen 8 to second reflective surface member 18 and finally too the user 4 via viewing path 26. Notice that the users head 404 is in a more raised position thereby removing strain and fatigue from the users neck 402.

The first reflective surface member 10 is held in place by bracket assembly 40. The second reflective surface member 18 is held in place by a pair of bracket assemblies 20. Bracket assembly 20 is held onto the top edge of computer screen housing 8 by tightening a thumb screw 202 that is threaded into the U shaped portion bracket assembly 20 causing the tip of thumb screw 202 to frictionally abutt computer screen housing 8.

Figure 3:
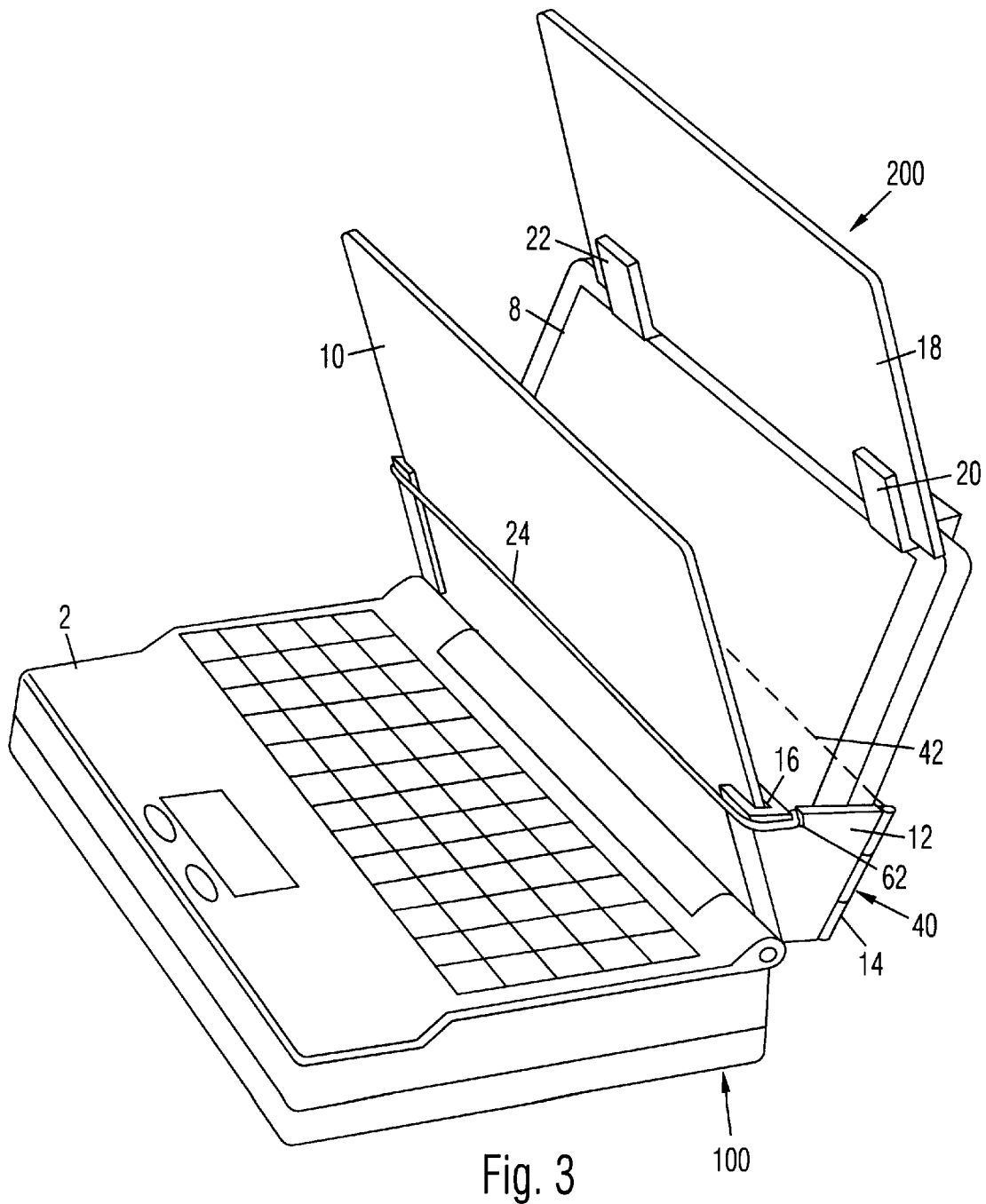
FIG. 3 is a perspective view of the present invention affixed to a lap top computer.
Figure 5:
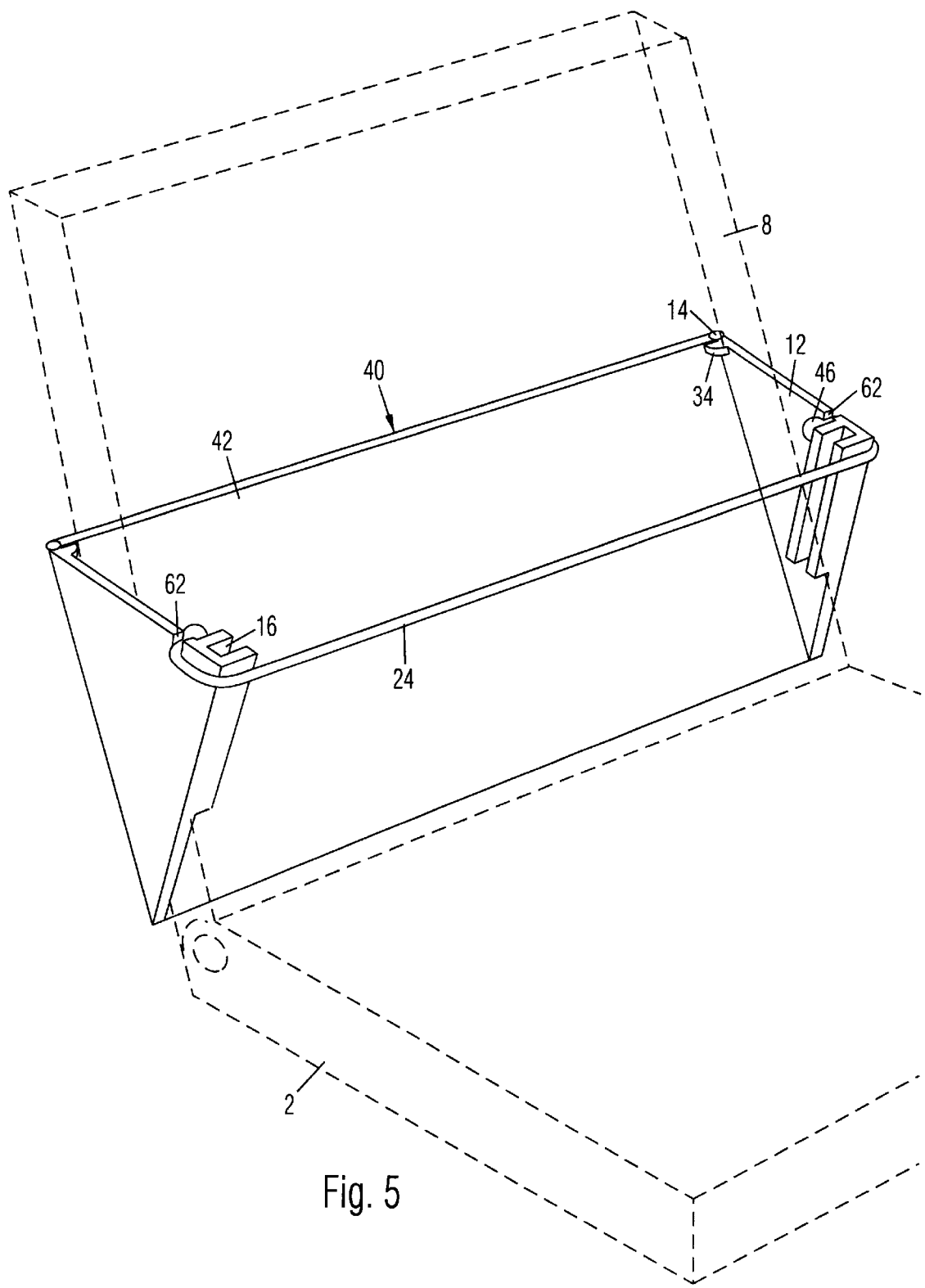
FIG. 5 is a perspective view of the first hinged bracket of the present invention.

Flat resilient member 204 is placed between screw tip 202 and computer screen housing 8 thereby reducing the change of marring the surface of housing 8 FIG. 3 shows a perspective view of the present invention 200 in place on a standard lap top computer 100. Flat plate 42 shown by a dotted line is placed along the back, lower surface of computer screen housing 8. A hinge 14 is located at either side of plate 42 and a triangular plate 12 helps form the correct angle so that when reflective surface 10 is placed into slot 16 it can reflect the information shown on computer screen 8 onto second reflective surface 18 and finally to the user. FIG. 5 shows a more detailed view of bracket assembly 40. When triangular plate 12 is folded into position, stop block 34 keeps triangular plate 12 at ninety degrees relative to flat plate 42. Elastic cord 24 is held in place when it is removably inserted into grooves 62, 62.

Elastic cord 24 helps hold the hinged assembly 40 in place and also helps hold reflective member 10 in place. Second reflective member 18 slips into slots located in second bracket pair 20, 22. In the preferred embodiment the reflective members 10, 18 are made of clear acrylic that has a reflective coating on the rear surface. The entire assembly 200 of the present invention is light weight and does not adversely affect the use or operation of the lap top computer to which it is attached. Because most lap top computers have a plan dimension of eight inches by ten inches, the improved viewing device of the present invention can fit onto most lap top computers.

Figure 4:
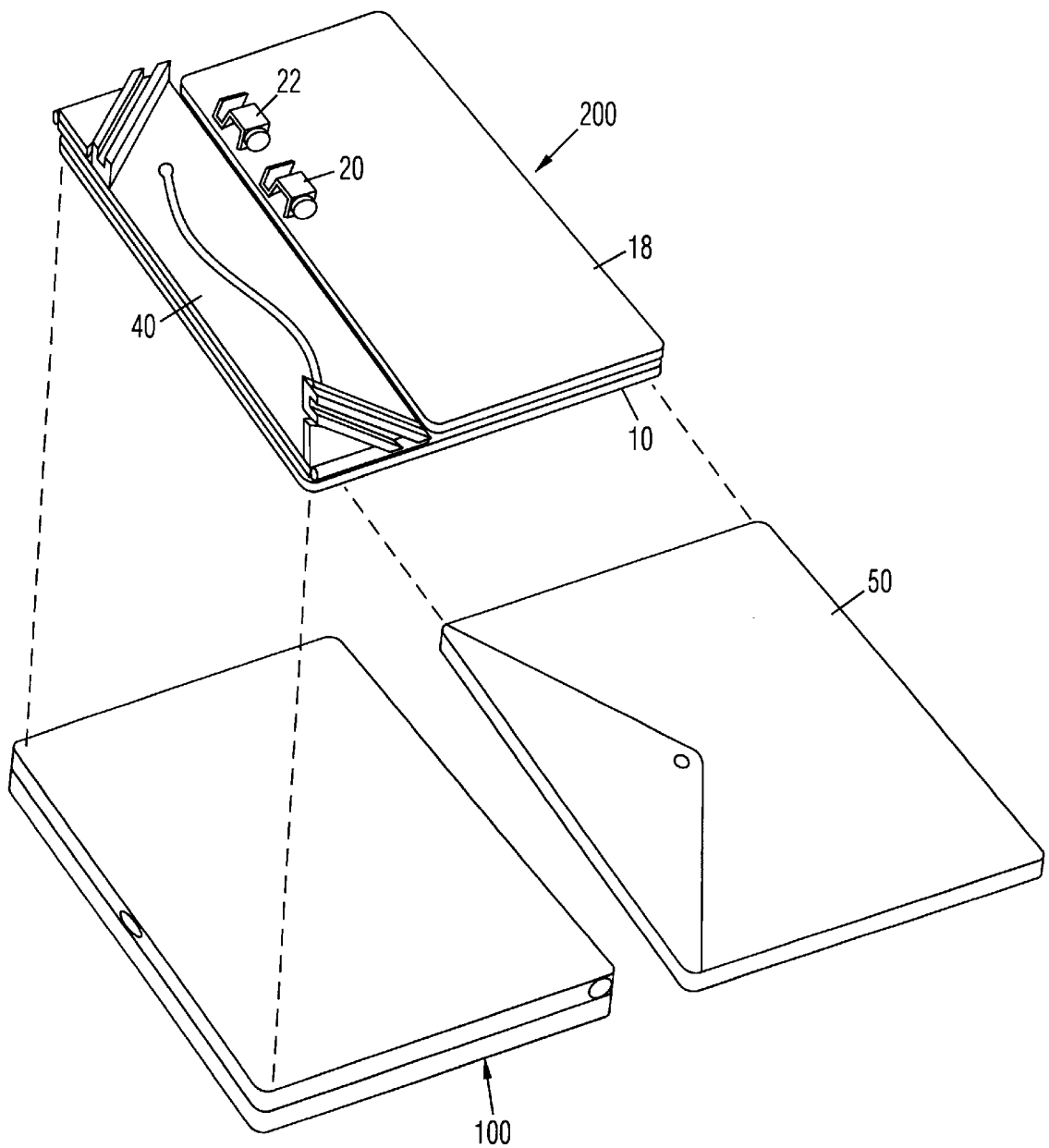
FIG. 4 is an exploded view of the present invention in a folded position ready for storage.

FIG. 4 shows an exploded view of the collapsed version of the present invention 200 about to be inserted into a thin carry case 50. Note that the overall size of the folded assembly 200 is approximately the same size in plan view as a standard lap top computer 100 so that the present invention can be easily carried along with the lap top computer 100.

By use of the present invention 200 as described above, a person can use a lap top computer without bending his or her neck into an uncomfortable downward position thereby reducing the chance of neck fatigue and potential neck pain. Because the device 200 is light weight and collapsible, it can be easily transported along with a lap top computer to any desired destination.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An improved viewing system for lap top computers comprising:

a first reflective surface member;

a hinged holding bracket for first reflective surface member;

a second reflective surface member;

a pair of second brackets to hold said second reflective surface member;

said hinged holding bracket fitted behind and wrapping around a screen of said lap top computer and comprised of a flat plate terminating at each end in a hinged triangular shaped plate, each said triangular plate having a pair of raised ribs for receiving corner of said first reflective surface member;

said second brackets are affixed to the top edge of said lap top computer and having upwardly angled ribs for receiving bottom edge of said second reflecting surface member;

said first and second reflective surface members positioned in such a way that an user of said lap top computer can see the image generated on said lap top computer screen said second reflective surface member which is at a higher viewing angle than said lap top screen thereby reducing chance of neck fatigue and potential discomfort by the user, wherein said second brackets removably affixed to the top of said lap top computer screen by means of a thumb screw threaded into the second bracket, the end of said screw frictionally abutting the outer surface of said lap top computer screen housing.

2. An Improved viewing system for lap top computers as claimed in claim 1 wherein said hinged holding bracket is removably held in place by an elastic cord that stretches from one said triangular plate to said opposing triangular plate.

3. An improved viewing system for lap top computers as claimed in claim 1 wherein said first and second brackets, and said first and second reflective surface members can fold flat and be stored in a case that is approximately the same size in plan view as a standard lap top computer.

* * * * *